(12) United States Patent
Salasidis

(10) Patent No.: US 12,202,069 B2
(45) Date of Patent: Jan. 21, 2025

(54) SYSTEM AND METHOD FOR CALIBRATING LASER MARKING AND CUTTING SYSTEMS

(71) Applicant: SALASOFT INC, Saint-Laurent (CA)

(72) Inventor: Robert Salasidis, Saint-Laurent (CA)

(73) Assignee: SALASOFT INC, Quebec (CA)

( * ) Notice: Subject to any disclaimer, the term of this patent is extended or adjusted under 35 U.S.C. 154(b) by 494 days.

(21) Appl. No.: 17/717,271

(22) Filed: Apr. 11, 2022

(65) Prior Publication Data
US 2023/0321751 A1 Oct. 12, 2023

(51) Int. Cl.
| | |
|---|---|
| *B23K 26/035* | (2014.01) |
| *B23K 26/06* | (2014.01) |
| *B23K 26/066* | (2014.01) |
| *B23K 26/08* | (2014.01) |
| *B23K 26/082* | (2014.01) |
| *G02B 26/08* | (2006.01) |

(52) U.S. Cl.
CPC ........ *B23K 26/035* (2015.10); *B23K 26/0648* (2013.01); *B23K 26/066* (2015.10); *B23K 26/0665* (2013.01); *G02B 26/08* (2013.01); *B23K 26/082* (2015.10); *B23K 26/0853* (2013.01)

(58) Field of Classification Search
CPC .... B23K 26/035; B23K 26/042; B23K 26/06; B23K 26/0648; B23K 26/0643; B23K 26/064; B23K 26/066; B23K 26/0665; B23K 26/0661; B23K 26/082; B23K 26/0823; B23K 26/0853; B23K 26/362; B23K 26/38; B23K 26/705; B23K 26/704; G02B 26/10; G02B 26/08; G02B 26/105; G01B 11/24; G01B 11/002; G01B 21/10; G01B 21/042; G01B 9/02072; G01B 2290/65; G01N 21/274; G01C 15/002
USPC ......... 356/243.1, 614, 237.5, 317, 318, 602, 356/622; 700/166; 702/85, 94, 150, 159, 702/127, 158, 95, 104, 108, 97, 166, 182, 702/183, 172, 152, 105
See application file for complete search history.

(56) References Cited

U.S. PATENT DOCUMENTS

| | | | |
|---|---|---|---|
| 8,288,679 B2 * | 10/2012 | Unrath | B23K 26/0648 |
| | | | 219/121.67 |
| 8,404,998 B2 | 3/2013 | Unrath et al. | |
| (Continued) | | | |

FOREIGN PATENT DOCUMENTS

| | | |
|---|---|---|
| BE | 1022258 B1 | 3/2016 |
| CN | 109141223 B | 6/2020 |
| (Continued) | | |

*Primary Examiner* — Jeffrey P Aiello
(74) *Attorney, Agent, or Firm* — PERRY + CURRIER INC.

(57) ABSTRACT

A method of calibrating a laser galvanometer to an XY stage by directing a defocused laser beam through a galvanometer and onto an XY stage and re-centering the laser beam at subsequent positions on the XY stage. Offsets are calculated based on the required movement of the galvanometer to recenter the laser beam at each of the positions on the XY stage. The laser beam may be defocused by focusing the laser beam at a distance Z both above or below the XY stage for each position and then calculating the offset for each position by averaging the values calculated at the focus distances Z above and below the XY stage. The laser beam may also be defocused by passing it through a pinhole.

18 Claims, 5 Drawing Sheets

(56) References Cited

U.S. PATENT DOCUMENTS

| | | | |
|---|---|---|---|
| 9,233,025 B2 * | 1/2016 | Spooner | A61F 9/00827 |
| 9,945,938 B2 | 4/2018 | Markendorf | |
| 10,314,746 B2 * | 6/2019 | Angeley | A61F 9/009 |
| 10,712,576 B1 * | 7/2020 | McEldowney | G03H 1/0248 |
| 10,852,519 B2 | 12/2020 | Sze et al. | |
| 10,871,790 B2 | 12/2020 | Sharpe et al. | |
| 10,952,827 B2 | 3/2021 | Verker et al. | |
| 2005/0205778 A1 * | 9/2005 | Kitai | B23K 26/364 |
| | | | 250/309 |
| 2005/0275848 A1 * | 12/2005 | Hill | G01B 9/02002 |
| | | | 356/512 |
| 2010/0292947 A1 * | 11/2010 | Buk | B23K 26/082 |
| | | | 702/94 |
| 2010/0301024 A1 * | 12/2010 | Unrath | B23K 26/40 |
| | | | 219/121.81 |
| 2017/0038591 A1 | 2/2017 | Jepsen | |

FOREIGN PATENT DOCUMENTS

| | | | | |
|---|---|---|---|---|
| DE | 102006007170 B4 | 6/2009 | | |
| EP | 1345026 A2 * | 9/2003 | | G01N 21/253 |
| EP | 2101672 B1 | 8/2012 | | |
| JP | 2007010636 A | 1/2007 | | |
| JP | 2008506146 A | 2/2008 | | |
| JP | 2020527291 A | 9/2020 | | |
| KR | 101895629 B1 | 9/2018 | | |
| WO | WO-03097290 A1 * | 11/2003 | | B23K 26/02 |

* cited by examiner

SYSTEM AND METHOD FOR CALIBRATING LASER MARKING AND CUTTING SYSTEMS

TECHNICAL FIELD

The present disclosure relates generally to the use of lasers and other precision marking and cutting tools, and more particularly to improved methods and apparatus for calibrating such tools.

BACKGROUND

Laser marking and/or cutting tools operate by directing the output of a high-power laser via precision optics and CNC (computer numerical control) to a material to be cut and/or marked, such as a printed circuit board, signs, etc. The laser beam is focused and directed at the material using, for example, a telecentric lens and a galvanometer (sometimes called a "galvo") for positioning the laser beam (focused through the lens) with respect to two-dimensional (e.g., XY) marking fields on the material. The material is thereby ablated, melted, burned, vaporized, etc., according to a pattern determined by the CNC machine, leaving an edge with a high-quality surface finish.

A moving XY mechanical stage can be added to expand the range of the marking field. The galvo and XY stage can then be coordinated between each other, either moving simultaneously; for example, using an Infinite Field Of View (IFOV) scan or an XL SCAN (which involves synchronously controlling a 2D scan head and an XY stage with two servo axes) depending on vendor. Alternatively an intermittent "stitch-type movement" where the stage is moved incrementally, and portions of the field are marked in series can also be used. With either technique, errors typically arise between the XY position of the galvo and XY stage (usually as a result of errors within the galvo or the lenses used), reducing accuracy of measurements and other actions.

Therefore, precision marking and cutting tools require careful alignment and calibration of the various lasers, precision optics and a CNC machine. Presently, alignment and calibration is simply accomplished by a customer marking a piece of glass with a given pattern. Should a coordinate measuring machine (CMM) not be available, the marked glass is sent to the manufacturer of the marking and cutting tool who then generates a calibration file based on the CMM measurements. The calibration file is then returned to the customer and used to calibrate the marking and cutting tool. Unfortunately, even if a CMM machine is available, the actual time and manpower required to perform the CMM measurements is significant, and can have sources of human error.

A significant issue with such prior-art calibration techniques is that is that calibration is accomplished offline, which is time-consuming, expensive, and must be repeated each time there is a configuration change or adjustment within the tool. Although real-time calibration processes are also known (for example using position sensing diodes (PSDs)), such PSDs are at risk of being destroyed by the focused high-power laser beam. Furthermore, most PSD sensors cannot accurately determine the position of the laser beam due to its small spot size. In addition, calibration of the laser in the out of focus position, or while still collimated, introduces errors that affect the final calibration (as a result of alignment and lens telecentricity errors).

SUMMARY OF THE INVENTION

In various aspects, the disclosure provides methods, apparatus, and programming product for precision calibration of lasers and other cutting, measuring, and observational processes.

For example, in various aspects the disclosure provides means including methods, apparatus, and programming product for calibrating the galvos and other devices relative to an XY stage position, so that any error(s) between the two are minimized (this is referred to as relative error calibration). Absolute error calibrations can also be performed with the present system, in some embodiments including the placement of glass scales, which may for example be built into the stages themselves. As such, low micron or submicron accuracy can easily be achieved.

In one aspect, the present system provides a method of calibrating a laser galvanometer to an XY stage, comprising:
  (a) directing a defocused laser beam through a galvanometer and onto an XY stage;
  (b) moving the XY stage to a first position that centers the defocused laser beam on a position sensing diode on the XY stage thereby calibrating the galvanometer to the first position of the XY stage (coordinate 0,0);
  (c) moving the XY stage from the first position to a second position;
  (d) moving a laser galvanometer to direct the defocused laser beam to the second position on the XY stage;
  (e) calibrating the galvanometer to the second position on the XY stage by:
    (i) determining if the laser beam is centered on the position sensing diode, and if not
    (ii) moving the XY galvos to a position such that the laser beam is centered on the position sensing diode, and then
    (iii) recording the movement of the XY galvo to center the beam on the the position sensing diode (which is attached to the XY stage) as an offset for the second position; and
  (f) repeating the above steps for a plurality of subsequent positions, thereby recording an offset for each of the subsequent positions.

In various preferred aspects, the laser beam is defocused by focusing the laser beam at a distance Z both above or below the XY stage. Offsets can then be calculated for each position on the XY stage both when the laser is focused at distance Z above the position, and at distance Z below the position. Since both these distances Z are the same, their results can be averaged to calculate an accurate offset at each position.

In differing approaches, all of the offsets for all of the positions can be calculated with the laser focused distance Z above the XY stage and then all of the offsets can be calculated with the laser focused distance Z below the XY stage. Alternatively, the laser beam may first be focused below the XY stage (for one pass over the various positions on the XY stage) and then focused above the XY stage (for a subsequent pass over the various positions on the XY stage). The advantage of either of these approaches is that the laser only needs to be refocused once per pass over the XY stage. Alternatively, the laser may be focused both above and below each point and that position's particular offset may be calculated before moving onto the next position. It is to be understood that the present system as claimed encompasses all of these different approaches and is not limited to performing the focusing steps for each position in any particular order.

In alternate approaches, the laser beam may be defocused by passing the laser beam through a pinhole or an array of pinholes. It is to be understood that this optional step of passing the laser beam through a pinhole to defocus it may be carried out instead of, or in addition to, the step of focusing the laser beam distances Z above and below the XY stage.

As such, one preferred solution includes measuring the position of a laser beam suspended proximate and directed toward a graduated or ungraduated table in a defocused condition, and then in conditions of increased and/or decreased focus (of equal magnitude). By averaging the positions of the light from the measurements taken at equal distances z above and below the XY stage, an offset error can be determined for that particular position. Such offset determination methods are fast and easy to implement, and require no modification to the laser path used in normal operations.

A second preferred technique disclosed herein makes use of one or more precision pinholes, each typically (but not exclusively) approximately 0.1-1.5 mm in diameter. Where multiple pinholes are provided, they can be arranged in arrays of desired shapes and spacings, depending upon the application and measuring devices used. An advantage of this approach is that the resultant diffraction and beam attenuation can result in a focused beam size that is large enough and of low-enough intensity to be accurately sensed by the PSD at the focused position.

In another aspect, the present system also comprises a device for calibrating a laser galvanometer to an XY stage, comprising:
(a) a frame having a base and a vertical support extending from the base;
(b) a laser system mounted to the vertical support, the laser system having a laser for emitting a laser beam and a galvanometer for aiming the laser beam;
(c) a moveable XY stage on the base;
(d) at least one position sensing diode on the moveable XY stage;
(e) a Z-axis distance sensor for determining a distance between the galvanometer and the XY stage;
(f) a system for defocusing the laser beam when the laser beam is incident on the position sensing diode on the moveable XY stage; and
(g) a calibration system for moving the XY stage and the galvanometer to successive positions and for determining an offset at each of the successive positions, wherein the offset for each position is calculated as a distance moved by the XY stage to center the laser beam on the position sensing diode.

In various embodiments, the invention provides systems and various components thereof, including software, for implementing the various functions and processes described herein.

BRIEF DESCRIPTION OF THE DRAWINGS

The invention is illustrated in the figures of the accompanying drawings, which are meant to be exemplary and not limiting, and in which like references are intended to refer to like or corresponding parts.

DETAILED DESCRIPTION OF EMBODIMENTS

Preferred embodiments of methods, systems, and apparatus according to the invention are described through reference to the drawings.

Figure 1:
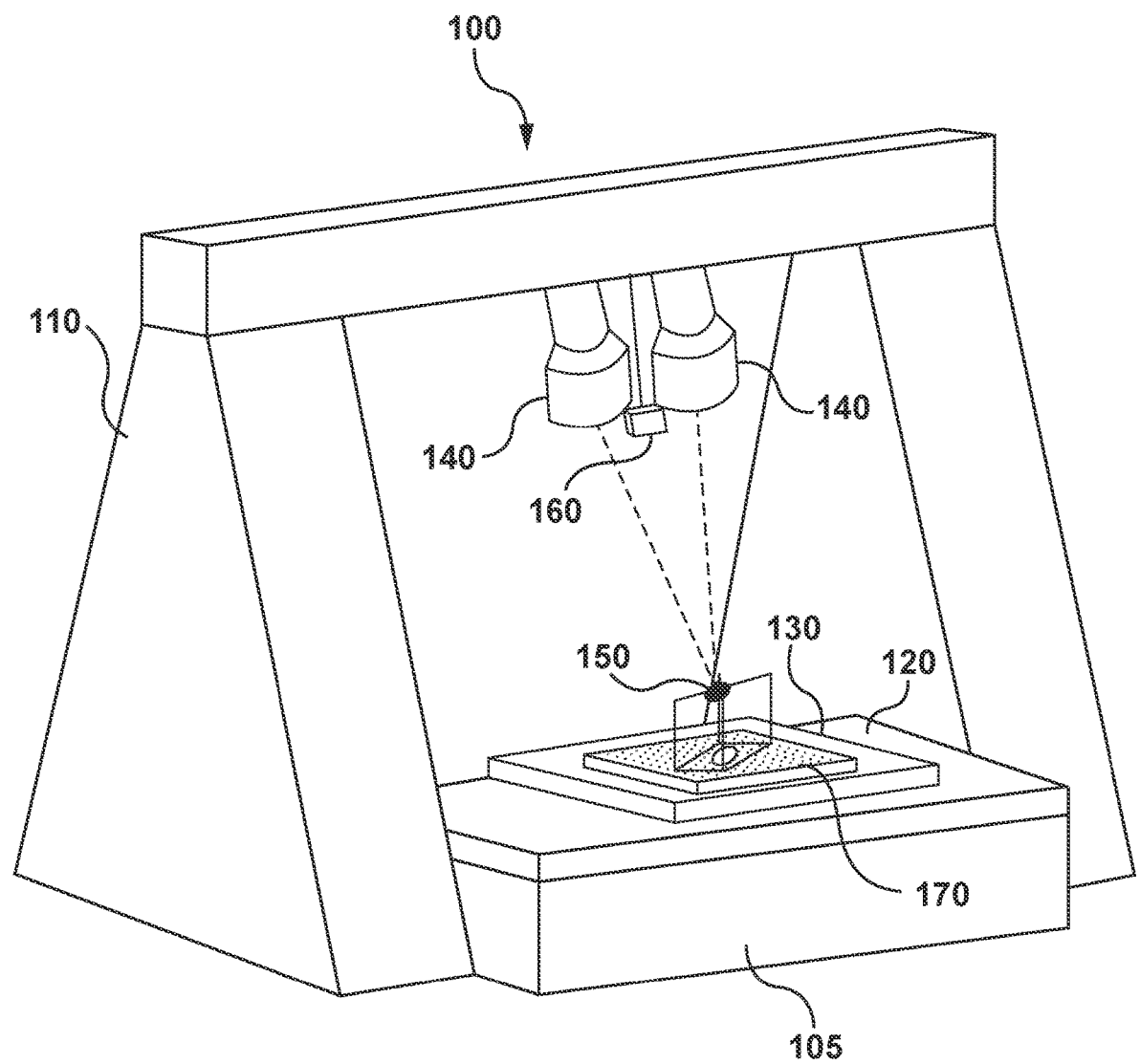
FIG. 1 shows an example of a system for calibrating a precision marking and cutting tool in accordance with various aspects of the disclosure.

FIG. 1 shows examples of components of an embodiment of a system 100 for calibrating a precision marking and cutting tool (or other laser systems) in accordance with various aspects of the present system. In the one embodiment shown, system 100 comprises a frame having a base 105 and vertical supports 110, made of relatively strong, stiff material, for supporting a calibration table 120 to which a moveable stage 130 is attached. The frame 110 can, for example, be a custom-designed granite frame for supporting the two (or three) dimensional XY (or XYZ) stage 130 attached to calibration table 120. The table 120 is moveable in positive and negative X and Y (and optionally Z) directions relative to the galvo position, as discussed below.

At least one laser or other precision locating/measuring device 140 is mounted to the frame 110, as discussed in greater detail below with reference to FIG. 2. In the embodiment of FIG. 1, two high power lasers 140 are shown, where one, for example, can be a UV laser and the other, for example, an IR laser. It is to be understood that the present system encompasses embodiments with one or more lasers, all keeping within the scope of the claimed system.

A first sensor, hereinafter position sensing diode (PSD) sensor 150, is fixed to the to the XY stage 130 that is sensitive to desired laser wavelengths (e.g. Thorlabs-PDP90A+KPA101, Hamamatsu PSD sensors 9 mm-S5991-01 and/or 4 mm S5990-01), and a second, hereinafter Z-axis distance sensor 160 (e.g. Keyense LK-H152) is fixed to a top beam of the frame 110. As will be explained herein, PSD sensor 150 and Z-axis distance sensor 160 are configured to determine a precise three-dimensional location of the at least one laser or other instrument, hereinafter lasers 140, relative to the XY stage 130 and/or table 120.

In various aspects and embodiments, XY stage 130 may be movable in either or both of forward and backward directions, or either or both of two or three orthogonal directions relative to the lasers 140, in order to controllably change the location of the lasers 140 relative to the stage 130 and thereby assist in calibrating the lasers 140. For example, in various embodiments an XY (or XYZ) stage 130 can be permanently or releasably affixed to table 120 that is moveable in some or all of such directions by the use of appropriately-configured servo motors (e.g.: linear or ball screw motors) adapted to travel with the table 120, as shown in FIG. 2. As lasers 140 are directed in such embodiments toward the XY stage 130, the one or more linear servo motors (e.g. Aerotech PRO180LM-400 and/or Aerotech PRO225LM-500 motors) can drive the table in one or more optionally orthogonal directions (XY). The distance sensor 160 is used to position the Z axis at the exact preferred laser focus distance to the PSD sensor for the particular laser/lens combination. The position of the laser beam is then sensed by PSD sensor 150. In optional embodiments, PSD sensor 150 can be enveloped by a sleeve to minimize stray light interference. This approach is especially helpful in high ambient lighting conditions.

Figure 2:
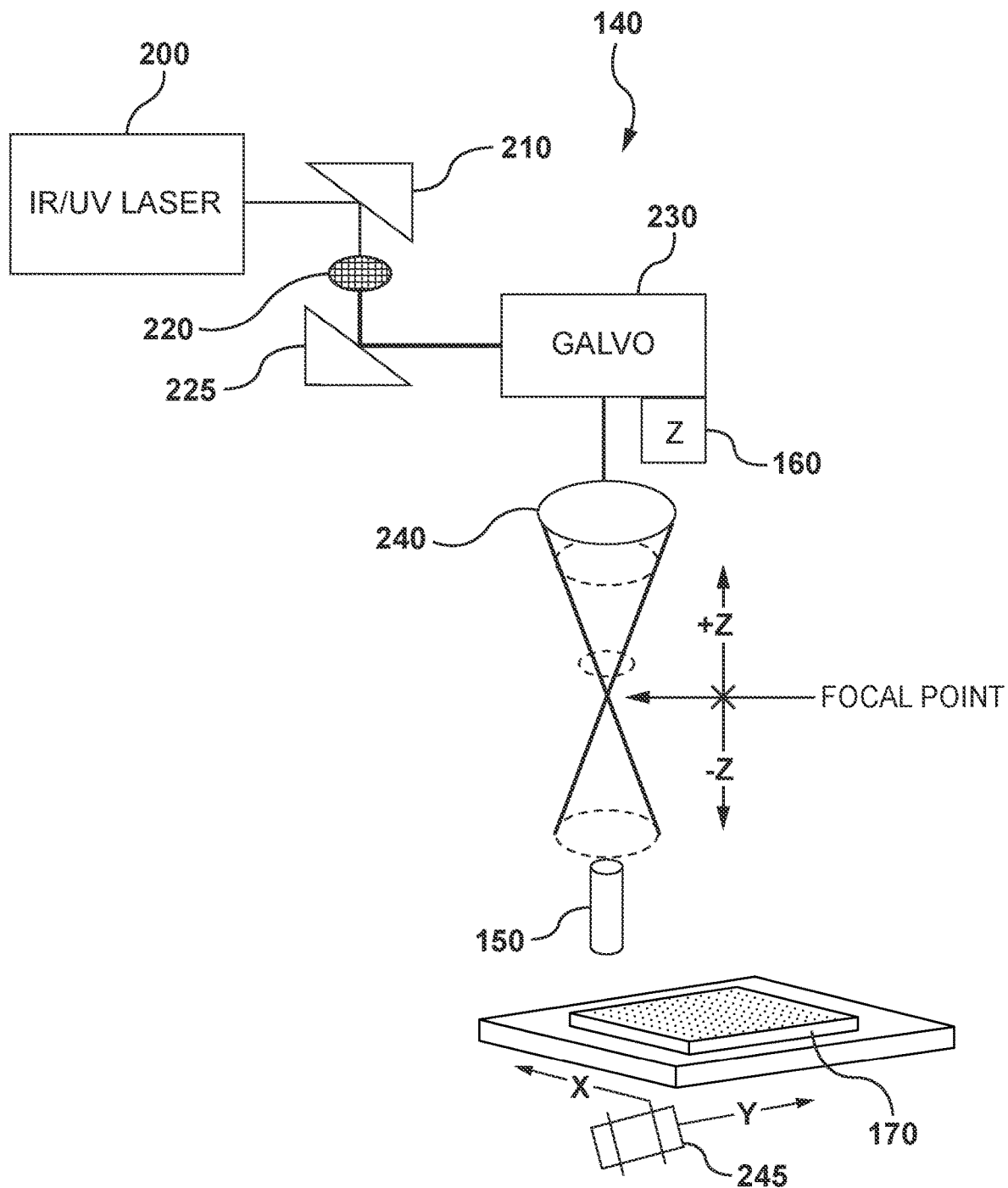
FIG. 2 shows an example of a laser or other instrument according to an exemplary embodiment.

Turning next to FIG. 2, details of each laser 140 are shown according to an exemplary embodiment. A beam of collimated light is generated by a laser source 200 (e.g. 1064 nm-IR-SPI Laser 20 W-SP-020P-A-EP-ZB-Y G4 20 W Air cooled, EP series and/or 355 nm-UV-Photonics Industries-20 W-DX-355-20), which can for example be water and/or air cooled, as required. The light beam passes through precision optics, described below, to impinge upon sensor PSD 150. Since the intensity of the focused light beam can be sufficient to destroy the PSD sensor 150, the light is either in accordance with the present system. In one aspect, the laser beam is defocused using a galvanometer/lens combination, hereinafter galvo 230 (e.g. Aerotech AGV-HPO 2-axis galvo scanner) to focus the laser beam at distances Z both above and below the XY stage 130. In another aspect, the laser beam is defocused by being passed through a precision pinhole. Specifically, in this second approach, an array 220 having pinholes of desired diameters can be used (e.g. in a range of 100 μm-2000 μm), depending on the nature and quality of light and the desired responses. For example, with a relatively low-powered laser, diameters of 500 μm may be used, whereas for a higher-powered laser a pinhole array of 16 pinholes may be used in a 3×5×5×3 array, 125 μm diameter, spaced 250 μm apart. Diffraction and attenuation of the collimated beam then results, and this beam passes to the mirror 225 into galvo 230 for precision beam direction. The pinhole array 220 causes diffractive beam divergence as well as overall attenuation which reduces beam intensity, and results in a focused position spot size that can be 2 orders magnitude or more larger than the original spot size. This can result in a beam focused position attenuated spot size that is in the order of 1-2 mm—large enough to be sensed by the PSD, and low intensity enough to not destroy it. It is to be understood that the present system is not limited to any particular dimensions for the pinhole or pinhole array being used.

A single pinhole 220 is likely adequate for green or red lasers where a PSD has its greatest sensitivity. In the UV (355) or IR (1064) spectrum, sensitivity can be quite low, and as such a single pinhole may not provide enough brightness on the PSD to give an adequate signal. A low signal can result in increased position calibration error. One solution might be to increase the beam intensity, but this can result in destruction of pinhole 220, as a high beam intensity may cause melting or deformation. In addition, a high beam intensity may cause excess back reflections that can damage the source laser itself (minimized by using a black coating on the laser side of the pinholes—such as Aktar black coating). Another solution could be to increase the pinhole diameter, but this would result in decreased diffraction and a smaller spot size—again resulting in danger to the PSD. Creating an array of closely spaced pinholes can result in order(s) of magnitude more light on the PSD, and the spot size can be finely regulated depending on the size, the number, and the spacing of pinholes. Generally, the smaller the pinholes, the larger the spot size. The more the pinholes, the more light gets through to PSD sensor 150.

It is also to be understood that the first defocusing approach (i.e.: of focusing at positions above and below XY stage 130), and the second defocusing approach (i.e.: of passing the laser beam through one or more pinholes) can be used separately or together, all keeping within the scope of the presently claimed system.

In preferred aspects, a telecentric or other non-telecentric lens 240 (e.g., Sill Optics GMbH SALFT3162/328 for use with IR devices, or SALFT3170/075 for use with UV devices) is mounted below the galvo 230 for focusing the laser beam. Mirrors 210 and 215 can also be used to direct the laser beam. If access to the collimated beam path is not available, the PSD sensor 150 can still be used in the calibration using the defocused position, as discussed below with reference to FIG. 4A. Specifically, by defocusing the beam at equal distances Z both above and below the PSD sensor 150 (at a distance calculated to give a spot size large enough to be detected by the PSD, and also to decrease the energy density of the laser), the calibration position can be calculated as the average position of the two PSD XY points at the two Z levels (as determined by a position move to +Z and -Z by servo motors 245). This novel approach can advantageously allow for laser calibration without need for extra hardware equipment installed in the laser path.

In order to minimize any non linearities in the PSD sensor 150, the actual corrected position can be determined by moving the galvo position so that the laser hits the same center spot in all point calibrations. The position off the center of PSD 150 is not used as a surrogate of the actual position. This results in elimination of PSD non linearity errors, as well as providing a calibration correction value that more appropriately determines the degree of offset required by the galvo 230 to achieve the correct position, and not the amount of correction required in the XY table to correct for the galvo error (something not possible with CMM techniques).

Figure 3:
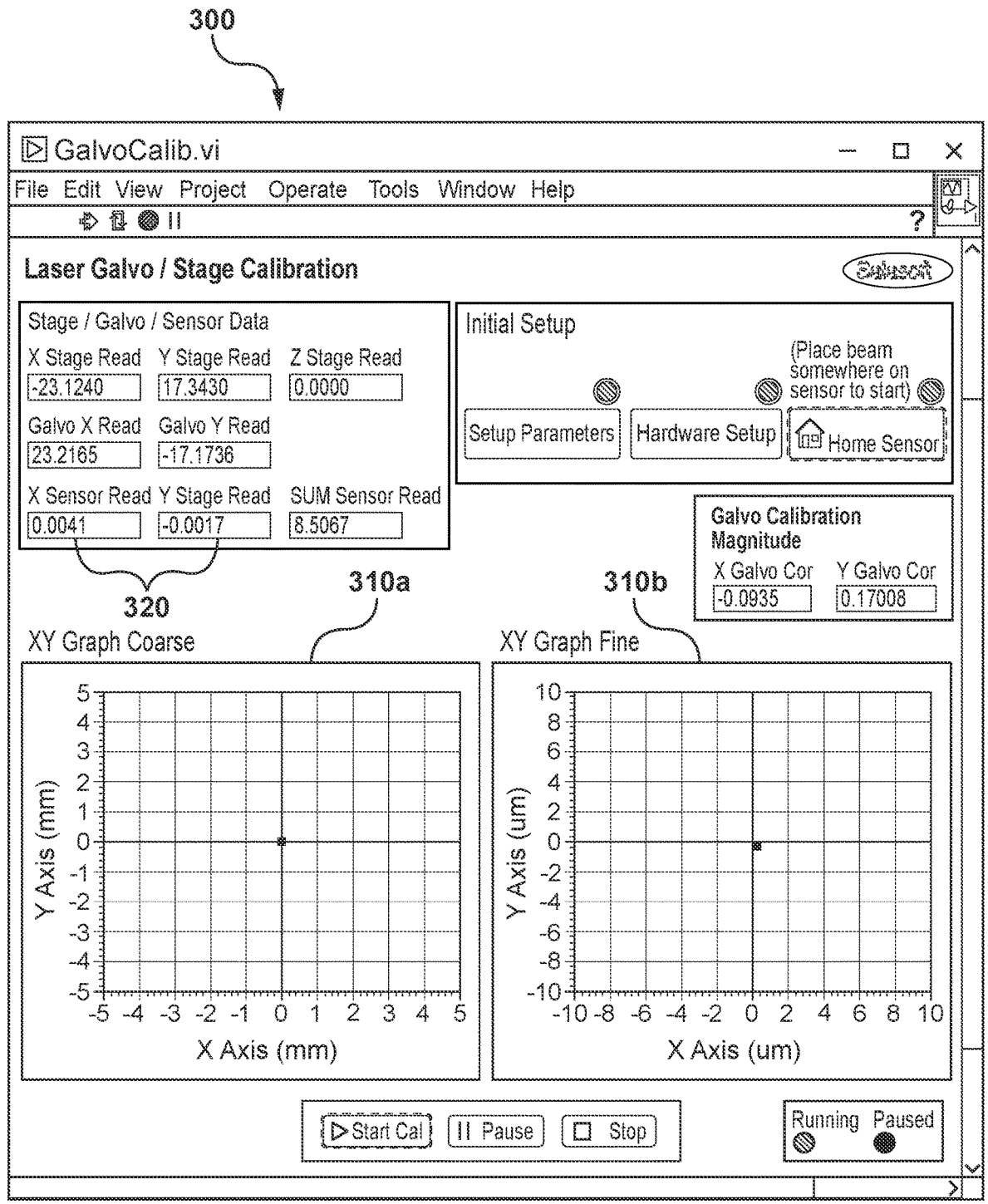
FIG. 3 shows an embodiment of a user interface adapted for calibration control of the laser of FIG. 2 in accordance with various aspects of the disclosure.

In further aspects and embodiments, the present system also provides software and user interfaces for controlling system 100. Specifically, FIG. 3 shows an embodiment of a user interface 300 adapted for calibrating lasers 140 relative to calibration table 120. The user interface 300 includes coarse and fine representations 310a and 310b of the beam position relative to the XY marking plate 170 as determined by PSD sensor 150.

Figure 4A:
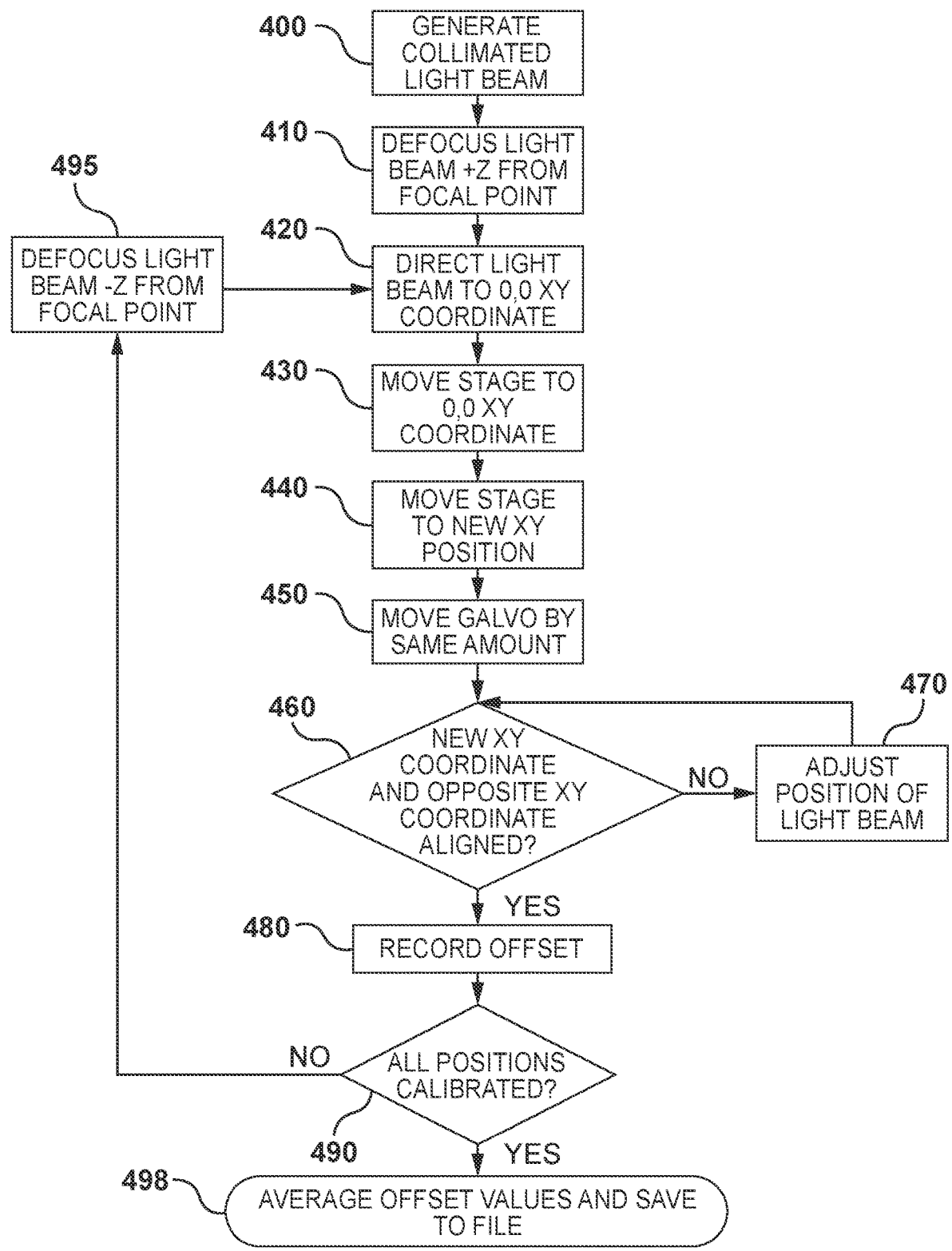
FIG. 4A is a flowchart showing a defocused light method of calibrating the system of FIG. 1 using the user interface of FIG. 3.

According to an aspect of this disclosure with reference to FIG. 4A, a method of calibrating the system 100 is provided that it based on defocusing the light beam at equal distances +Z above and -Z below PSD 150 so that the collimated beam does not damage/destroy the PSD 150. This preferred method comprises generating a beam of collimated light (at 400) via laser 200, and passing through the galvanometer laser combination (as shown in FIG. 2). This novel calibration approach results in a larger diameter spot size on PSD 150. For example, if the beam coming out of the lens 240 is at a 10 mm diameter and focuses at around 201 mm distance to 25 um diameter (a distance of +Z) it will spread out again to 10 mm at a distance of 402 mm when is strikes the PSD 150. Therefore, at 410, the beam is defocused a certain distance above and below the 201 mm focus point (i.e. distance +Z and distance -Z), resulting in a beam diameter that is larger than the focus spot size of 25 um. As an example, defocusing at Z=2-3 cm and -Z=2-3 cm is sufficient for a 1 mm minimum spot size on the PSD 150). Formulas for calculating the defocused spot size are readily available on eth Edmund Optics web site.

Returning to FIG. 4A, the laser beam is first defocused +Z from the focal point (at step 410). Galvo 230 then moves the beam to a centered (0,0 XY coordinate) uncalibrated reference position (at step 420), and servo motors 245 (FIG. 2) move the stage 130 so that the beam is centered on the PSD sensor 150 (at step 430). Next, motors 245 move the stage 130 to a new XY position and the galvo 230 moves the beam the same amount (at step 440). The Galvo stage is then moved, such that the actual position of the galvo lens combination correction values are recorded for each array position. The process is repeated through any desired pattern or array of positions (at steps 440, 450, 460, 470) and the galvo offset values are saved (at step 480) until all positions have been calibrated (at step 490). Thus, it will be appreciated that non-linearity errors in alignment of galvo 230, lens 240 and/or lasers 140 can result in the beam from lasers 140 no longer being centered on the PSD sensor 150, as shown for example by fine representation 310b in FIG. 3, where the beam is slightly off of the PSD center. The present software interface moves the galvo 230 so that the PSD is centered on the actual galvo position (i.e.: 0,0 XY coordinate on the software display—0,0 denoting the center of the PSD—not the XY stage coordinates), at step 470. Moving galvo 230 until the beam is over the center of the PSD sensor 150 allows recording of the calibration offset (at 480), e.g. as shown at 320 in FIG. 3.

This process can be repeated for as large an array as is required. The more the points, the less the interpolation distance between the points for error correction.

The process is then repeated a second time after defocusing the beam by −Z (at 495), after which the +Z and −Z values for each position are averaged and the average values are then saved as a calibration file at step 498. As such, all of the calibration readings for the various positions being calibrated may first be read at distance +Z above XY stage 130, the laser is then re-focused and all of the readings for each of the positions can then be measured at distances −Z below stage 130. Alternatively, all of the measurements for the various positions can first be taken with the laser beam focused at distance −Z, and then all of the measurements can be taken again with the laser beam focused at distance +Z above XY stage 130. The advantage of these two approaches is that it is only necessary to move the Z axis of the laser beam once. This order can be reversed with all of the positions measured with the laser beam focused at distance −Z, and then re-measured at distance +Z. In yet another approach, the +Z and −Z measurements can be taken for each position being calibrated before moving onto the next position to be calibrated (especially if a 3 axis Galvo is available, and not a mechanical Z axis). Thus, it is to be understood that the present method encompasses focusing the laser beam at the +Z and −Z distances for each of the positions to be calibrated in any order.

Figure 4B:
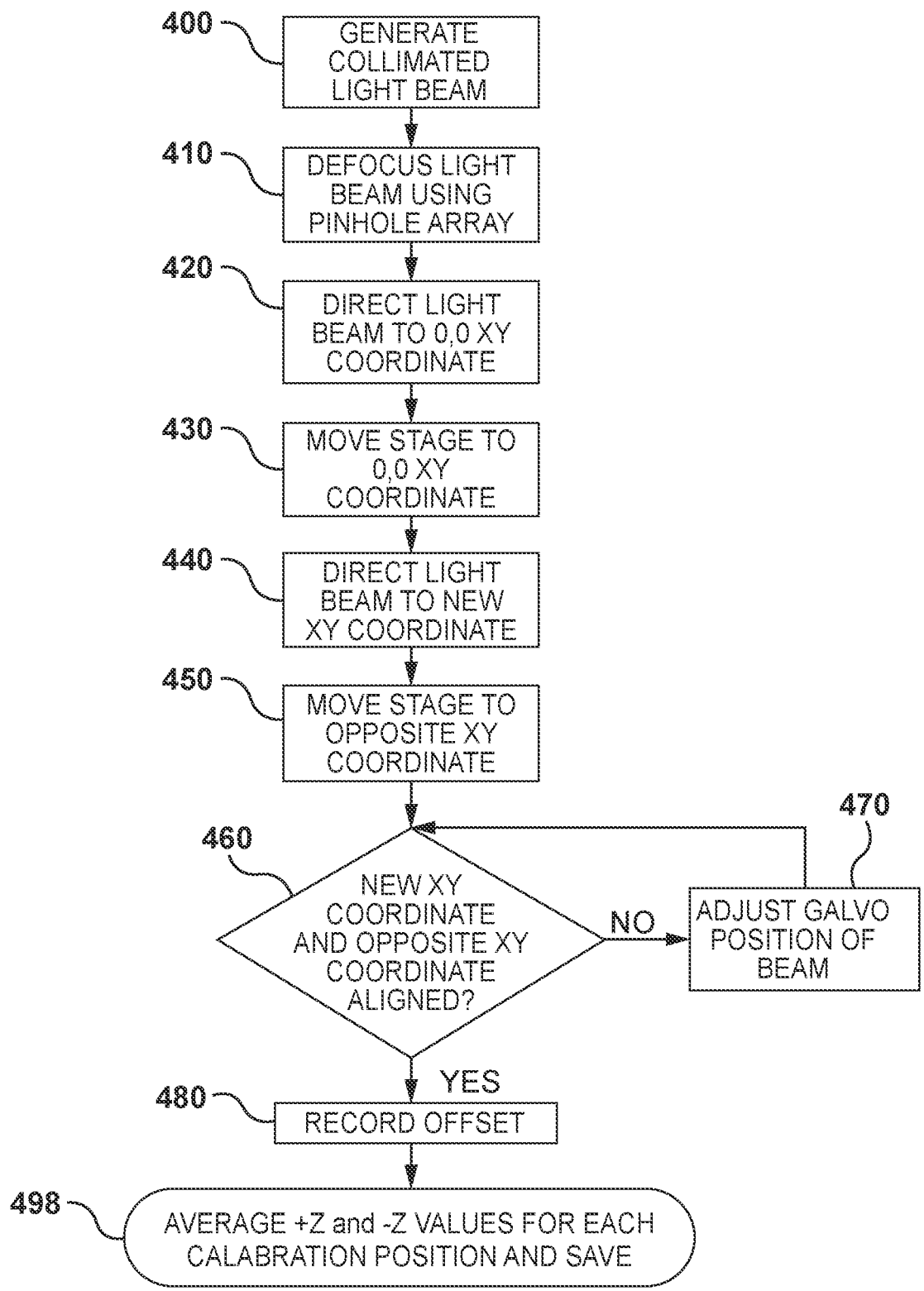
FIG. 4B is a flowchart showing a pinhole method of calibrating the system of FIG. 1 using the user interface of FIG. 3.

According to another novel aspect of this disclosure seen in FIG. 4B, a method of calibrating the system 100 is provided that uses pinhole array 220 to defocus the laser beam (at step 410B) so that the focused beam does not damage/destroy the PSD 150. In the method of FIG. 4B, the steps are the same as in the method of FIG. 4A, except that calibration occurs at only one Z value (i.e. the focal point). Therefore, calibration can be performed twice as quickly and potentially more accurately than when using the method of FIG. 4A. Another benefit of this pinhole technique (FIG. 4B) is that delta non linearity between the +Z/−Z defocus positions (FIG. 4A) can result in a small calibration error in the former technique, to which the pinhole method of calibration at the focus position is not susceptible. This pinhole approach is has the benefit of working well with non-telecentric lenses.

In order to minimize any non linearities in the PSD sensor, the actual corrected position is determined by moving the XY stage so that the laser hits the same center spot in all point calibrations. An advantage of this approach is that the position off-center of the PSD is not used as a surrogate of the actual position. This results in elimination of PSD non linearity errors, as well as providing a calibration correction value that more appropriately determines the degree of offset required by the galvo to achieve the correct position, and not the amount of correction required in the XY table to correct for the galvo error.

An advantage of this pinhole technique is that it can help to reduce or otherwise control beam pointing stability in the laser supply by eliminating the edges of the beam. Small µrad deviations in beam pointing can be reduced. There may still be some variations in intensity, but this does not matter for PSD sensing, as the XY position of stage 130 is normalized to the SUM of the total current on the PSD 150.

In summary, one aspect of the present system includes a method of calibrating a laser galvanometer 230 to an XY stage 130, comprising:

(a) directing a defocused laser beam through a galvanometer 230 and onto an XY stage 130;

(b) moving XY stage 130 to a first position that centers the defocused laser beam on a position sensing diode 150 on XY stage 130 thereby calibrating the galvanometer 230 to the first position of the XY stage; and then (c) moving XY stage 130 from the first position to a second position;

(d) moving a laser galvanometer 230 to direct the defocused laser beam to the second position on the XY stage; and then (e) calibrating the galvanometer 230 to the second position on XY stage 130 by:
  (i) determining if the laser beam is centered on the position sensing diode 150, and if not
  (ii) moving XY stage 130 to a position such that the laser beam is again centered on position sensing diode 150, and then
  (iii) recording the movement of XY stage 130 to center the laser beam on position sensing diode 150 as an offset for the second position; and then (f) repeating the above steps for a plurality of subsequent positions, thereby recording an offset for each of the subsequent positions. Preferably, these calculated offsets for each of the positions are recorded in a calibration file.

A neutral density filter (not shown) can optionally be placed over the position sensing diode. For example, if in-line access to a collimated beam is not available and laser power cannot be decreased sufficiently to avoid oversaturating the PSD or other sensor, use of a neutral density filter over the PSD sensor can result in useful calibrations. This may introduce refractive errors as a non-perpendicular beam (telecentricity error from lens) traverses the filter. However, in the defocus technique, this can be corrected: the angle is known (by calculating the stage Delta X and Y between the +Z and −Z positions versus the delta Z (distance between −Z and +Z) between the two defocus positions), the neutral density filter material refractive index for the given wavelength beam is known (usually BK glass or fused silica), and finally the thickness of the lens is also known. With these parameters the refractive position error can be calculated and corrected on a point-by-point basis when averaging the XY correction values between the two Z defocus positions. This allows for calibration with almost any laser with absolutely no access to the collimated beam path. In particular, this would be useful for lasers where even in the defocused position, the intensity cannot be decreased sufficiently (or where such decrease in intensity results in too much laser instability) to allow use with the PSD directly.

In another aspect of the present system, an apparatus 100 for calibrating a laser galvanometer 230 to an XY stage 130 is provided. Apparatus 100 preferably comprises:

(a) a frame 110 having a base 105 and a vertical support 110 extending therefrom;

(b) a laser system 200 mounted to vertical support 110, laser system 200 having a laser for emitting a laser beam and a galvanometer 230 for aiming the laser beam;

(c) a moveable XY stage 130 on base 105;

(d) at least one position sensing diode 150 on moveable XY stage 130;

(e) a Z-axis distance sensor 160 for determining a distance between galvanometer 230 and XY stage 130;

(f) a system for defocusing the laser beam when the laser beam is incident on the position sensing diode 150 on moveable XY stage 130; and (g) a calibration system for moving XY stage 130 and galvanometer 230 to successive positions and for determining an offset at each of the successive positions. The offset for each position is calculated as a distance moved by XY stage 130 to center the laser beam on position sensing diode 150 at each position.

In optional aspects, multiple PSD sensors 150 can be used for calibration. For example, a large sensor can be used to allow an uncalibrated laser beam to fall somewhere on the sensor to start the calibration procedure, while a smaller sensor can improve accuracy (9 mm and 4 mm square sensors, for example, in a test case). Thus, for example at least a 50% reduction in position uncertainty can be achieved through the use of two sensors. Software in accordance with aspects of the invention can be adapted to process multiple runs, including one as a rough calibration to determine an overall error, using smaller sensors in subsequent passes to perform calibrations of desired degrees or accuracy or fineness.

An advantage of all of the above techniques is that they can be performed without the use of neutral density glass type filters, beam splitters or other device that can alter beam direction (by refraction or reflection). This can for example eliminate whole sources of errors in calibration procedures.

Yet another advantage of the present system is that the use of techniques disclosed herein to take multiple readings, and averaging of multiple readings to eliminate electrical noise errors in A/D converters and/or in the PSD diodes themselves. Additionally, low pass filters can be added to the sensor readings to further eliminate any electrical noise from the source (the stage motors being the largest source of the electrical noise). This helps eliminate any small errors in laser alignment over time secondary to heat effects. This also results in a minimization of the calibration offset differences at any point between all the calibration passes. Automation of techniques is also contemplated as disclosed herein. For example, such automation can enable 65×65 point calibration without user intervention in a little over 1 hour (on the test system) with the pinhole technique (twice as long with the defocus technique, as two layers of measurements are taken).

Use of techniques described herein can correct errors in calibration of an XY stage to an XY galvo introduced by, for example, marking fiducial marks on a piece of glass fiducial marks with the galvo, and then using a CMM machine to get the position error of the marks and build a calibration file. This can, for example, not only be unnecessarily slow, but can generate significant flaws: for example the correction value determined in such cases is the delta error on the marked plate. The galvo error is not linear over the galvo field, and therefore the amount of actual movement of galvo position may be more or less than the marking difference observed. With the current technique, the actual galvo correction to calibrate is derived, and not just the measured difference.

While the disclosure has been provided and illustrated in connection with specific, presently-preferred embodiments, many variations and modifications may be made without departing from the spirit and scope of the invention(s) disclosed herein. The disclosure and invention(s) are therefore not to be limited to the exact components or details of methodology or construction set forth above. Except to the extent necessary or inherent in the processes themselves, no particular order to steps or stages of methods or processes described in this disclosure, including the Figures, is intended or implied. In many cases the order of process steps may be varied without changing the purpose, effect, or import of the methods described. The scope of the invention is to be defined solely by the appended claims, giving due consideration to the doctrine of equivalents and related doctrines.

What is claimed is:

1. A method of calibrating a laser galvanometer to an XY stage, comprising:
    (a) directing a defocused laser beam through a galvanometer and onto an XY stage;
    (b) moving the XY stage to a first position that centers the defocused laser beam on a position sensing diode on the XY stage thereby calibrating the galvanometer to the first position of the XY stage;
    (c) moving the XY stage from the first position to a second position;
    (d) moving a laser galvanometer to direct the defocused laser beam to the second position on the XY stage;
    (e) calibrating the galvanometer to the second position on the XY stage by:
        (i) determining if the laser beam is centered on the position sensing diode, and if not
        (ii) moving the Galvo XY to a position such that the laser beam is centered on the position sensing diode, and then
        (iii) recording movement of the galvanometer center the laser beam on the position sensing diode as an offset for the second position; and
    (f) repeating the above steps for a plurality of subsequent positions, thereby recording an offset for each of the subsequent positions, wherein the laser beam is defocused by focusing the laser beam at a distance Z either above or below the XY stage.

2. The method of claim 1, wherein the laser beam is focused at distance Z above the XY stage and is also focused at distance Z below the XY stage at each of the first, second and subsequent positions, and the offsets for each of the first, second and subsequent positions are calculated by averaging the offsets calculated when the laser beam is focused at distance Z above and at distance Z below the XY stage for each position.

3. The method of claim 2, wherein the offsets are calculated for all of the positions with the laser beam first focused distance Z above the XY stage and then the offsets are calculated for all of the positions with the laser beam focused distance Z below the XY stage.

4. The method of claim 2, wherein the offsets are calculated for all of the positions with the laser beam first focused distance Z below the XY stage and then the offsets are calculated for all of the positions with the laser beam focused distance Z above the XY stage.

5. The method of claim 2, wherein the offset is calculated for each position with the laser focused at each of distances Z above and Z below the XY stage prior to moving the XY stage to the next position to calculate the offset for the next position.

6. The method of claim 1, wherein the laser beam is focused with a telecentric lens.

7. The method of claim 1, wherein the offsets for each of the positions are recorded in a calibration file.

8. The method of claim 1, wherein the position sensing diode provides an electronic/electrical output of the position of the beam on the diode.

9. The method of claim 1, further comprising placing a neutral density filter over the position sensing diode.

10. A method of calibrating a laser galvanometer to an XY stage, comprising:
 (a) directing a defocused laser beam through a galvanometer and onto an XY stage;
 (b) moving the XY stage to a first position that centers the defocused laser beam on a position sensing diode on the XY stage there by calibrating the galvanometer to the first position of the XY stage;
 (c) moving the XY stage from the first position to a second position;
 (d) moving a laser galvanometer to direct the defocused laser beam to the second position on the XY stage;
 (e) calibrating the galvanometer to the second position on the XY stage by:
  (i) determining if the laser beam is centered on the position sensing diode, and if not
  (ii) moving the Galvo XY to a position such that the laser centered on the position sensing diode and then
  (iii) recording movement of the galvanometer to center the laser beam on the position sensing diode as an offset for the second position; and
 (f) repeating the above steps for a plurality of subsequent positions, thereby recording an offset for each of the subsequent position, wherein the laser beam is diffracted by passing the laser beam through at least one pinhole.

11. The method of claim 10, wherein the pinhole has a diameter of <100 μm-2000 μm.

12. The method of claim 10, wherein the at least one pinhole is an array of pinholes.

13. An apparatus for calibrating a laser galvanometer to an XY stage, comprising:
 (a) a frame having a base a vertical support extending from the base;
 (b) a laser system mounted to the vertical support, the laser system having a laser for emitting a laser beam and a galvanometer for aiming the laser beam;
 (c) a moveable XY stage on the base;
 (d) at least one position sensing diode on the moveable XY stage;
 (e) a Z-axis distance sensor for determining a distance between the galvanometer and the XY stage;
 (f) a system for defocusing the laser beam when the laser beam is incident on the position sensing diode on the moveable XY stage; and
 (g) a calibration system for moving the XY stage and the galvanometer to successive position and for determining an offset at each of the successive positions, wherein the offset for each position is calculated as a distance moved by the galvanometer relative to the XY stage to center the laser beam on the position sensing diode, wherein the defocusing system is a system for focusing the laser beam at distances Z both above and below each of the positions to be calibrated.

14. The apparatus of claim 13, wherein the laser system further comprises a telecentric lens for focusing the laser beam.

15. The apparatus of claim 13, wherein the calibration system calculates the offset for each position by:
 (i) determining if the laser beam is centered on the position sensing diode, and if not
 (ii) moving the Galvo XY to a position such that the laser beam is centered on the position sensing diode, and then
 (iii) recording the movement of the galvanometer to center the laser beam on the position sensing diode.

16. The apparatus of claim 13, wherein the moveable XY stage is disposed on a calibration table on the base of the frame.

17. The apparatus of claim 13, wherein the calibration system comprises a user interface allowing a user to make both coarse and fine adjustments to the position of the laser beam on the XY stage.

18. An apparatus for calibrating a laser galvanometer to an XY stage, comprising:
 (a) a frame having a base and a vertical support extending from the base;
 (b) a laser system mounted to the vertical support, the laser system having a laser for emitting a laser beam and a galvanometer for aiming the laser beam;
 (c) a moveable XY stage on the base;
 (d) at least one position sensing diode on the moveable XY stage;
 (e) a Z-axis distance sensor for determining a distance between the galvanometer and the XY stage;
 (f) a system for defocusing the laser beam when the laser beam is incident on the position sensing diode on the moveable XY stage; and
 (g) a calibration system for moving the XY stage and the galvanometer to successive positions and for determining an offset at each of the successive positons, wherein the offset for each position is calculated as a distance moved by the galvanometer relative to the XY stage to center the laser beam on the position sensing diode, wherein the defocusing system is a system for passing the laser beam through at least one pinhole.

* * * * *